United States Patent Office 3,696,085
Patented Oct. 3, 1972

3,696,085
PROCESS FOR PRODUCING POLYMERS OF TERTIARY AMIDES
Michael Lederer, Frankfurt am Main, and Sommer Siegfried, Bad Soden, Taunus, Germany, assignors to Farbwerke Hoechst Aktiengesellschaft vormals Meister Lucius & Bruning, Frankfurt am Main, Germany
No Drawing. Continuation of application Ser. No. 822,044, May 5, 1969. This application Sept. 4, 1970, Ser. No. 69,991
Int. Cl. C08f 1/11, 3/90, 15/00
U.S. Cl. 260—80.3 N    5 Claims

ABSTRACT OF THE DISCLOSURE

A process for producing polymers of tertiary amides selected from the group consisting of N-vinyl lactams and N-vinyl amides of the formula:

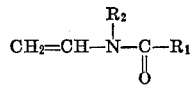

in which $R_1$ represents a member selected from the group consisting of hydrogen and an aliphatic group containing 1 to 20 carbon atoms and $R_2$ represents an aliphatic group containing 1 to 20 carbon atoms is disclosed. The polymers may be homopolymers or copolymers of the tertiary amides with up to 50 percent calculated on the weight of the tertiary amides of monoolefinically unsaturated comonomers. Polymerization may be effected at a temperature of 0° to 150° C. in the presence of 0.001 to 5% by weight, based on the weight of monomers, of a free radical polymerization catalyst and in the presence of a saturated aliphatic hydrocarbon containing 3 to 20 carbon atoms. The polymers obtained are in pulverulent form and their aqueous solutions exhibit relatively low surface tensions.

This is a continuation of application Ser. No. 822,044, May 5, 1969, which in turn is a continuation-in-part of applications Ser. Nos. 463,927 and 477,025 filed June 14, 1965 and Aug. 3, 1965, respectively, both applications are now abandoned.

It is known that aliphatic tertiary N-vinylamide such, for example, as N-vinyl-N-methyl acetamide, can be polymerized in mass with iodine, benzoyl peroxide or boron trifluoride, whereby liquid or solid polymers or copolymers are obtained which have undergone a more or less pronounced, undesired change of colour.

It is already known to homopolymerize or copolymerize aliphatic tertiary N-vinyl amides in mass or solution in the presence of radical-forming azo compounds which initiate the polymerization.

It is furthermore known to polymerize N-vinyl pyrrolidone in bulk in the presence of hydrogen peroxide (German Patent 757,355) and azo-bis-isobutyronitrile (J. W. Breitenbach, A. Schmidt M83,833 (1952)), respectively, as catalyst. The polymerization and copolymerization of N-vinyl pyrrolidone in solution initiated by radical liberating compounds is known, too. As solvents there are used water, tetrahydrofurane, benzene, methanol and acetone.

However, the aforementioned processes of polymerization have serious disadvantages.

In most cases mass polymerization cannot be carried out on an industrial scale because it is impossible to dissipate the heat that forms. Reactions that cannot be controlled may deteriorate the quality of the polymers. The incomplete conversion of the monomers into the corresponding polymers (degree of conversion of 65 to 86%) has a particularly unfavorable effect. The elimination of the residual monomers requires a considerable outlay on plant.

Solution polymerization can be carried out more advantageously in practice. However, here, too, no complete conversion can be attained, that is to say, in addition to the polymer the solutions contain considerable quantities of residual monomers which may have a detrimental effect when the polymer solutions are applied for further purposes. In order to eliminate the portion of monomer that has not been polymerized the polymers have to be precipitated by means of a non-solvent such, for example, as diethyl ether or cyclohexane, or the polymers have to be isolated by spray drying or drum drying.

Another disadvantage of the aforesaid processes is the long duration of polymerization. In most cases a degree of conversion of more than 90% is attained after 20 or more hours only.

U.S. Pat. No. 3,218,501 to Melamed teaches that in the presence of a polymeric granulating agent N-vinyl pyrrolidone can also be polymerized in solvents in which the polymer is insoluble, but this process has serious disadvantages too.

Now we have found that the homopolymerization and copolymerization of N-vinyl lactams such as, for example, N-vinylpyrrolidone and N-vinyl caprolactam and the homopolymerization and copolymerization of aliphatic tertiary N-vinyl amides of the following Formula I

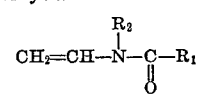

in which $R_1$ represents hydrogen or an aliphatic group containing 1 to 22 carbon atoms and $R_2$ represents an aliphatic group containing 1 to 20 carbon atoms can be carried out in advantageous manner over a wide range of temperature, for example, from 0 to 150° C., in the presence of a free radical polymerization catalyst and in the presence of aliphatic hydrocarbons, because this process leads to the formation of solid homopolymers and copolymers which can be isolated very easily.

It could not be expected that the homo- or copolymerization of N-vinyl lactams and tertiaryl N-vinylamides in the aforementioned aliphatic hydrocarbons in the absence of a granulating agent or any other special additive would lead to suspensions of polymers which can be easily stirred and which can be filtered without difficulties. According to the process of the invention the particulate products can be obtained in a reaction mixture containing only the monomers, catalyst and the defined solvent, thereby producing a purer product in a very economical way.

As aliphatic hydrocarbons in the process according to the invention there may be preferably used those containing 3 to 20 carbon atoms in a straight-chain or in branched structure, as there are, for example, propane, straight-chain or branched butanes, pentanes, hexanes, heptanes, octanes and nonanes as well as paraffin oils or industrial petroleum fractions. The proportion by volume of the monomer or monomers, to the aliphatic hydrocarbon or hydrocarbons, preferably ranges between 1:10 and 5:1. As catalysts there are used, according to the process of the invention radical-forming substances such as peroxide compounds and/or azo compounds, for example, azo-bis-isobutyro-nitrile, and, moreover, azo dicarboxylic acids and their derivatives. As peroxide compounds there are used, for example peroxyacetals of Formulae II and III

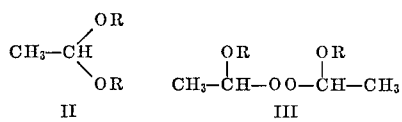

or -acylamino peroxides of the general Formula IV

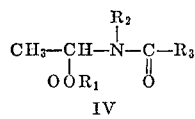

or lactam peroxides of Formulae V and VI

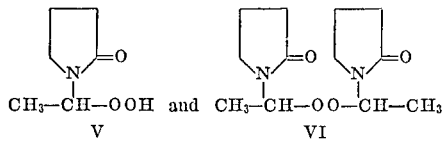

of peroxy esters of the general Formula VII

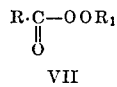

In the general formulae R represents a straight-chain or branched aliphatic radical containing 1 to 12 carbon atoms, $R_1$ represents a branched aliphatic, araliphatic or cycloaliphatic radical preferably containing 3 to 12 carbon atoms, $R_2$ represents a straight-chain or branched aliphatic radical containing 1 to 20 carbon atoms, and $R_3$ represents a hydrogen atom or a straight-chain or branched aliphatic radical containing 1 to 20 carbon atoms.

In general the catalysts are applied in an amount of from 0.001 to 5% by weight, preferably from 0.01 to 3% by weight, calculated on the monomer phase. Polymerization temperature generally is in the range of from 0 to 150° C., preferably from 40 to 120° C.

As comonomers copolymerizable with the tertiary amide selected from the group consisting of N-vinyl lactams and aliphatic tertiary amides of the above cited Formula I and which can be used in an amount of up to 50 percent calculated on the weight of the teritary amides there may be mentioned, for example, monoolefinically unsaturated compounds, for example derivatives of acrylic acid such as acrylonitrile, acrylic esters, preferably esters of acrylic acid with saturated monohydric aliphatic alcohols containing 1 to 12 carbon atoms and acryl amide, the corresponding derivatives of methacrylic acid, vinyl esters, for example vinyl esters of aliphatic carboxylic acid containing 1 to 18 carbon atoms such as vinyl acetate, vinyl propionate, vinyl butyrate and vinyl stearate, as well as vinyl ethers with alkyl radicals containing 1 to 17 carbon atoms, vinyl halides such as vinyl chloride and vinylidene chloride, and, furthermore, the esters of maleic acid and fumaric acid, as well as the esters of vinyl phosphonic acid preferably esters of maleic, fumaric or vinyl phosphonic acid, with saturated, monohydric aliphatic alcohols containing 1 to 12 carbon atoms. Of course, it is likewise possible to polymerize (a) N-vinyl lactams with one another or (b) the aliphatic tertiary N-vinyl amides of the above cited formula I with one another as well as, at the same time, (a) or (b) with two or more of the above mentioned comonomers.

When carrying out the process according to the invention it is advisable to place at least one half of the hydrocarbon or hydrocarbons used into the reaction vessel before the beginning of the reaction and to heat it or them to the desired reaction temperature. While stirring, the monomer in which the catalyst has been dissolved and which, moreover, is diluted with the remaining amount of hydrocarbon, is then introduced into the reaction vessel.

The copolymers may be prepared according to different modes of execution. The different monomers may be introduced into the reaction space either mixed with one another or separately, in identical proportions or in a proportion which is altered while feeding.

The polymesr and copolymers, respectively, are obtained in pulversulent form. They are isolated, possibly after cooling with the aid of the usual filtration devices, and afterwards they are dried, according to the type of hydrocarbon used, in a vacuum dryer, in a paddle dryer or in a fluidized bed dryer.

According to their composition the polymers and copolymers, respectively, are soluble in water or in organic solvents such as alcohols, ketones, chlorinated hydrocarbons, dimethyl formamide or pyridine.

The products prepared according to the invention can be used in a wide range of applications, for example as dispersing agents as thickeners or as textile auxiliaries.

As compared with products that have been prepared in solution the products obtained by the process of the present invention have inter alia, an improved surface tension. This phenomenon is particularly pronounced in copolymers as can be seen from the following table.

| Polymer | Surface tension in dynes/cm. of an aqueous solution of— | | |
|---|---|---|---|
| | 0.1% strength | 0.5% strength | 1% strength |
| Copolymer according to Example 2 given below | 37.5 | 35.5 | 34.3 |
| Comparison product prepared by a known process | 48.4 | 41.5 | 40.3 |

According to Houben-Weyl, volume 14/1, page 1115 last 7 lines and page 1116 lines 1 and 2 (Georg Thieme Verlag Stuttgart 1961) the cationic polymerization of vinyl pyrrolidone in petroleum ether yields sticky and viscous masses. It was, therefore, surprising that the polymerization initiated by free radicals of N-vinyl-lactams in aliphatic hydrocarbons yields high molecular weight granular polymers having good stirring and filtering properties and that the use of a dispersing agent is not necessary. The "granulating agents" mentioned in U.S. Pat. 3,218,302 can also be regarded as dispersing agents. It is quite obvious that the absence of a dispersing or granulating agent means an industrial progress. The smaller the number of foreign substances in the polymerization system the higher the purity of the product obtained.

By the process according to the invention industrially interesting homopolymers and copolymers of aliphatic tertiary N-vinyl amides and N-vinyl lactams can be prepared in a shorter time than by the known processes and besides they are obtained in higher yields and have better properties.

The following examples serve to illustrate the invention but they are not intended to limit it thereto, the parts being by weight unless otherwise stated and the relationship of parts by weight to parts by volume being the same as that of the kilogram to the liter.

EXAMPLE 1

220 parts by volume of n-heptane were placed into a reaction vessel provided with stirrer, reflux condenser, dropping funnel and thermometer and heated under an atmosphere of nitrogen to 95° C. Then a solution containing 100 parts of N-vinyl-N-methyl acetamide, 110 parts by volume of n-heptane and 0.37 part of azo-diisobutyronitrile was added dropwise in the course of 120 minutes. After the addition of the monomer stirring was continued for another 50 minutes. Then the whole was cooled. The polymer which was obtained in the form of powder and grains was filtered off, washed with heptane and dried in vacuo at 80° C.

93.5 parts of polymer having a specific viscosity $(\eta_{spec.}/c.)$

EXAMPLES 5 TO 10

91.5 parts of N-vinyl-N-methyl acetamide and 8.5 parts of 2-ethyl hexyl acrylate were polymerized in an apparatus as in Example 1. For this purpose, in each of the experiments 200 parts by volume of one of the hydrocarbons indicated in the table given below were placed into the apparatus before the beginning of the reaction and heated to the polymerization temperature. The monomer mixture and the catalyst which was dissolved in 100 parts by volume of the hydrocarbon were added dropwise in the course of 45 minutes. The periods of polymerization and the yields can be seen from the following table.

| | | | Polymerization | | | |
|---|---|---|---|---|---|---|
| Ex. No. | Hydrocarbon | Catalyst | Temperature, °C. | Period, hours | Yield, percent | Specific viscosity ($\eta_{spec.}/c.$) |
| 5 | Petroleum boiling between 80° and 110° C. | 0.33 part of AIBN [1] | 90 | 3 | 99 | 1.40 |
| 76 | Petroleum boiling between 60° and 95° C. | 0.31 part of peroxy ester [2] | 65 | 3 | 84 | 1.04 |
| 8 | Iso-octane | 0.31 part of AIBN [1] | 95 | 3 | 95 | 1.38 |
| 9 | n-Heptane | 0.25 part of AIBN [1] and 0.12 part of t.-BHP [4] | 95 | [3] | 83 | 0.84 |
| 1 | do | 0.37 part of hydroperoxide [5] | 95 | 6 | 62 | 1.11 |
| 0 | do | 0.3 part of AIBN [1] and 0.12 part of mercaptane [7] | 95 | [6] | 87 | 0.54 |

[1] AIBN=azo bisisobutyronitrile.
[2] Trimethyl acetic acid tert. butyl peroxy ester.
[3] 2 hours 30 minutes.
[4] Tert. butyl hydroperoxide.
[5] α-Pyrrolidonyl ethyl hydroperoxide.
[6] 2 hours 30 minutes.
[7] Tert. dodecyl mercaptane.

of 1.60 (measured at 20° C. in an aqueous solution of 1% strength) were obtained.

A solution of 1% strength of the polymer had a surface tension of 65.3 dynes/cm. (measured according to Le Compte de Nouilly). A comparison product which had been prepared in an aqueous solution in the presence of azo diisobutyronitrile had a surface tension of 67.1 dynes/cm.

EXAMPLE 2

202 parts by volume of n-heptane were placed into an apparatus as described in Example 1. 100 parts of a solution containing 91.5 parts by volume of N-vinyl-N-methyl acetamide and 8.5 parts by volume of 2-ethyl hexyl acrylate and 0.33 part of azo diisobutyronitrile were run in in the course of 100 minutes, while stirring. The mixture was stirred for another hour and then cooled. The copolymer was obtained in the form of a fine powder. It was separated by filtration, washed with heptane and dried in vacuo at 80° C. The copolymer which had a specific viscosity ($\eta_{spec.}/c.$) of 1.46 (measured in a solution of 1% strength in methanol) was obtained in a yield of 98 parts. An aqueous solution of 1% strength had a surface tension of 34.3 dynes/cm. and a solution of 0.1% strength had a surface tension of 37.5 dynes/cm. The corresponding values of the surface tension of a comparison product which had been prepared in a methanolic solution were 40.3 and 48.4 dynes/cm.

EXAMPLE 3

The polymerization was carried out in the manner described in Example 2 but instead of azo diisobutyronitrile 0.5 part of α(ethoxy)-ethyl tert. butyl peroxide was dissolved in the monomer mixture as the catalyst. After 6 hours of polymerization 98 parts of a copolymer having a specific viscosity of 2.05 (measured in a methanolic solution of 1% strength) were obtained. The product was soluble in methanol and chloroform but only sparingly soluble in water.

EXAMPLE 4

The polymerization was carried out in the manner described in Example 2 but as the catalyst 0.66 part of trimethyl acetic acid tert. butyl peroxy ester and, instead of heptane, the same amount of n-hexane were used. The polymerization was carried out at 65° C. After 4 hours 97.5 parts of a pulverulent copolymer were obtained.

EXAMPLE 11

200 parts by volume of n-heptane were heated to 95° C. in an apparatus as described in Example 1. 50 parts of N-vinyl-N-methyl acetamide, 40 parts of vinyl acetate, 10 parts of 2-ethyl hexyl acrylate and 0.34 part of azo bisisobutyronitrile as a catalyst in 100 parts by volume of n-heptane were run in in the course 45 minutes with the exclusion of air. After another 90 minutes the copolymer was separated, washed with hexane and dried in vacuo at 80° C. The yield was 94.1 parts. The copolymer had a specific viscosity ($\eta_{spec.}/c.$) of 1.07 (determined in a solution of 276 mg. of KOH/1 g. of substance. The calculated saponification number was 290 mg. of KOH/1 g. of substance. An aqueous solution of 0.1% strength of the copolymer had a surface tension of 33.6 dynes/cm.

EXAMPLE 12

A solution of 90 parts of N-vinyl-N-methyl acetamide, 10 parts of vinyl phosphonic acid bis-2-ethyl hexyl ester and 0.34 part of azo bisisobutyronitrile in 100 parts by volume of n-heptane was added dropwise under an atmosphere of nitrogen and while stirring to 200 parts by volume of n-heptane which had previously been heated to 95° C. After the solution had been added within 45 minutes stirring was continued for 135 minutes. 91.5 parts of a copolymer having a specific viscosity ($\eta_{spec.}/c.$) of 0.99 (determined in a solution of 1% strength in methanol) and containing 0.8% of phosphorus were obtained. An aqueous solution of 1% strength of the copolymer had a surface tension of 30.7 dynes/cm.

EXAMPLE 13

80 parts of N-vinyl-N-methyl acetamide and 20 parts of maleic acid bis-2-ethyl hexyl ether were dissolved in the presence of 0.34 part of azo bisisobutyronitrile as a catalyst in 100 parts by volume of a petroleum fraction boiling between 80° and 110° C. The resulting solution was run in the course of an hour under an atmosphere of nitrogen, while stirring into 200 parts by volume of a petroleum fraction boiling between 80° and 110° C., which had previously been heated to 90° C. Stirring was continued for another two hours. The copolymer was then isolated by means of a filtering device, washed with hexane and dried in vacuo at 80° C. The yield amounted to 84.5 parts of polymer.

EXAMPLE 14

100 parts of N-vinyl-N-methyl formamide and 0.5 part of trimethyl acetic acid tert. butyl peroxy ester were added dropwise, while stirring, in the course of 45 minutes, at 65° C. with the exclusion of air to 500 parts by volume of hexane. The polymer separated in the form of a powder having a fine particle size. After 5 hours 93.5 parts of a homopolymer having a specific viscosity ($\eta_{spec./c.}$) of 1.58 (measured in a solution of 1% strength in water) were obtained.

EXAMPLE 15

324 cc. of heptane are introduced, with the exclusion of air, into a reaction vessel provided with stirrer, reflux condenser, dropping-funnel and thermometer, and are heated to 95° C. While stirring, a mixture of 144.6 g. of N-vinyl pyrrolidone, 16.1 g. of 2-ethylhexyl acrylate, 0.54 g. of azo-bis-isobutyronitrile and 162 cc. of heptane is dropped in over a period of 30 minutes. The mixture is stirred for further 45 minutes and is then cooled. The pulverulent polymer is separated from the solution with the aid of a firit. After washing with hexane the polymer is dried under vacuum at 80° C. 158 g. of a polymer having a K-value of 56 are obtained.

EXAMPLE 16

Like in Example 15 there are polymerized 80 parts by weight of N-vinyl pyrrolidone and 20 parts by weight of 2-ethylhexyl acrylate in the presence of 0.5 part by weight of trimethyl acetic acid-tert.-butyl peroxy ester as catalyst at a temperature of 68° C. Instead of heptane there is used the same amount of hexane. After 150 minutes there are obtained 96.5 parts by weight of polymer.

EXAMPLE 17

Like in Example 15 there is polymerized a mixture of 136.59 g. of N-vinylpyrrolidone and 24.11 g. of maleic acid bis-2-ethylhexyl ester in the presence of 540 mg. azo-bis-isobutyronitrile as catalyst. 324 cc. of heptane are placed into the reaction vessel and heated to 95° C., and the mixture of the monomers diluted with 162 c. of heptane is dropped in over a period of 45 minutes. After one more hour the pulverulent polymer is separated and dried under vacuum at 80° C. Yield 158 g., corresponding to 98% of the theory.

EXAMPLE 18

In an apparatus as described in Example 15, 386 cc. of hexane are heated to 65° C. In a $N_2$ atmosphere there is dropped in over a period of 30 minutes, while stirring, a solution of 80.35 g. of N-vinylpyrrolidone, 16.07 g. of 2-ethylhexyl acrylate, 64.28 g. of vinyl acetate and 0.5 g. of trimethyl acetic acid tert.-butyl peroxy ester as catalyst. Then there are added 100 cc. of hexane. After a polymerization period of 120 minutes there is obtained a very finely granulated polymer which is dried under vacuum at 80° C. after filtration and washing with hexane. Yield: 140 g. The 1% solution in methanol has an $\eta_{spec./c.}$-value of 1.32 (20° C.).

EXAMPLE 19

In an apparatus as described in Example 15, 480 cc. of hexane are heated to 65° C. with the exclusion of air. While stirring, a solution of 50 g. of N-vinyl-ε-caprolactam and 0.5 g. of trimethyl acetic acid tert.-butyl peroxy ester as catalyst in 160 cc. of hexane is dropped in over a period of 45 minutes. The polymer separates in the form of a fine powder. After a polymerization period 4½ hours at 65° C. there are obtained 40.7 g. of a pulverulent polymer, which corresponds to a yield of 81.4%. The 1% solution in methanol has an $\eta_{spec./c.}$-value of 0.34 (20° C.).

EXAMPLE 20

A solution of 80 g. of N-vinyl-ε-caprolactam, 20 g. of 2-ethylhexyl acrylate and 0.75 g. of trimethyl acetic acid tert.-butyl peroxy ester as catalyst in 160 cc. of hexane is added, over a period of 45 minutes and with the exclusion of atmospheric oxygen, to 480 cc. of hexane at 65° C., while stirring. The polymer separates in the form of a very finely dispersed powder. After a polymerization period of 4½ hours at a temperature of 65° C. there are obtained 76 g. of polymer, which corresponds to a 76% yield.

We claim:

1. A process for the production of polymers of tertiary N-vinyl amides in particulate form which comprises polymerizing one or more N-vinyl amides of the formula:

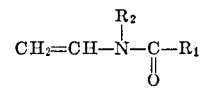

in which $R_1$ represents hydrogen or an aliphatic group of 1 to 20 carbon atoms and $R_2$ represents an aliphatic group of 1 to 20 carbon atoms, either alone or with up to 50 percent based on the weight of the N-vinyl amide of one or more other mono-olefinically unsaturated compounds with which said amides are copolymerizable, said polymerization being effected at a temperature of 0 to 150° C. under the action of 0.001 to 5% by weight, based on the total weight of monomer, of a free radical polymerization catalyst in the presence of a saturated aliphatic hydrocarbon of 3 to 20 carbon atoms and in the absence of a granulating agent or dispersing agent for said polymers.

2. A process for the production of polymers of tertiary N-vinyl amides in particulate form which comprises polymerizing N-vinyl-N-methylacetamide, either alone or with up to 50 percent based on the weight of the amide of one or more other mono-olefinically unsaturated compounds with which said amide is copolymerizable, said polymerization being effected at a temperautre of 0 to 150° C. under the action of 0.001 to 5% by weight, based on the total weight of monomer, of a free radical polymerization catalyst in the presence of a saturated aliphatic hydrocarbon of 3 to 20 carbon atoms and in the absence of a granulating agent or dispersing agent for said polymers.

3. A process for the production of polymers of tertiary N-vinyl amides in particulate form which comprises polymerizing N-vinyl-N-methylformamide, either alone or with up to 50 percent based on the weight of the amide of one or more other mono-olefinically unsaturated compounds with which said amide is copolymerizable, said polymerization being effected at a temperature of 0 to 150° C. under the action of 0.001 to 5% by weight, based on the total weight of monomer, of a free radical polymerization catalyst in the presence of a saturated aliphatic hydrocarbon of 3 to 20 carbon atoms and in the absence of a granulating agent or dispersing agent for said polymers.

4. A process for the production of polymers of tertiary N-vinyl amides in particulate form which comprises polymerizing N-vinyl-eta-caprolactam, either alone or with up to 50 percent based on the weight of the lactam of one or more other mono-olefinically unsaturated compounds with which said lactam is copolymerizable, said polymerization being effected at a temperature of 0 to 150° C. under the action of 0.001 to 5% by weight, based on the total weight of monomer, of a free radical polymerization catalyst in the presence of a saturated aliphatic hydrocarbon of 3 to 20 carbon atoms and in the absence of a granulating agent or dispersing agent for said polymers.

5. A process for the production of polymers of tertiary N-vinyl amides in particulate form which comprises copolymerizing N-vinyl-pyrrolidone with up to 50 percent based on the weight of the pyrrolidone of one or more other mono-olefinically unsaturated compounds with which said pyrrolidone is copolymerizable, said polymerization being effected at a temperature of 0 to 150° C.

under the action of 0.001 to 5% by weight, based on the total weight of monomer, of a free radical polymerization catalyst in the presence of a saturated aliphatic hydrocarbon of 3 to 20 carbon atoms and in the absence of a granulating agent or dispersing agent for said polymers.

References Cited

UNITED STATES PATENTS

| | | | |
|---|---|---|---|
| 3,218,302 | 11/1965 | Melamed | 260—80 |
| 2,958,590 | 11/1960 | Siegel | 44—62 |
| 3,451,976 | 6/1969 | Lucas | 260—78 |
| 2,953,546 | 9/1960 | Thomas et al. | 260—72 |
| 3,317,485 | 5/1967 | Blance et al. | 260—78.5 |

JOSEPH L. SCHOFER, Primary Examiner

J. KIGHT, III, Assistant Examiner

U.S. Cl. X.R.

260—78.5 R B, 80.3 R E, 80.72, 85.5 AM P, 85.7, 86.1 N, 87.5, 87.7, 88.3 R L, 89.7 R

UNITED STATES PATENT OFFICE
CERTIFICATE OF CORRECTION

Patent No. 3,696,085     Dated October 3, 1972

Inventor(s) Lederer et al.

It is certified that error appears in the above-identified patent and that said Letters Patent are hereby corrected as shown below:

In the Heading:

Change the name of the second-named inventor, "Sommer Siegfried" to --Siegfried Sommer--;

After "Ser. No. 69,991," insert --Claims priority, applications Germany, June 18, 1964, F 43 197 and August 14, 1964, F 43 751--.

Signed and sealed this 1st day of May 1973.

(SEAL)
Attest:

EDWARD M. FLETCHER, JR.       ROBERT GOTTSCHALK
Attesting Officer       Commissioner of Patents